(12) United States Patent
Eccles et al.

(10) Patent No.: US 7,708,527 B2
(45) Date of Patent: May 4, 2010

(54) RAM AIR TURBINE WITH COMPOUND GEARTRAIN GEARBOX

(75) Inventors: Steven R. Eccles, Torrance, CA (US); Wayne G. Schindler, Huntington Beach, CA (US); Ru-Li Kung, Walnut, CA (US)

(73) Assignee: Honeywell International Inc., Morristown, NJ (US)

( * ) Notice: Subject to any disclaimer, the term of this patent is extended or adjusted under 35 U.S.C. 154(b) by 452 days.

(21) Appl. No.: 11/330,855

(22) Filed: Jan. 12, 2006

(65) Prior Publication Data

US 2007/0160460 A1    Jul. 12, 2007

(51) Int. Cl.
*F03D 9/00* (2006.01)
*F04D 29/00* (2006.01)

(52) U.S. Cl. .............................. 416/170 R; 416/210 R

(58) Field of Classification Search ............ 416/170 R, 416/204 R, 210 R, 244 R
See application file for complete search history.

(56) References Cited

U.S. PATENT DOCUMENTS

| | | | |
|---|---|---|---|
| 3,633,411 A * | 1/1972 | Bass et al. ..................... 73/116 |
| 4,676,458 A | 6/1987 | Cohen | |
| 4,742,976 A | 5/1988 | Cohen | |
| 4,991,796 A * | 2/1991 | Peters et al. ................... 244/58 |
| 5,487,645 A | 1/1996 | Eccles | |
| 5,564,903 A * | 10/1996 | Eccles et al. ................. 416/174 |
| 6,142,418 A | 11/2000 | Weber et al. | |
| 6,580,179 B2 * | 6/2003 | Eccles et al. ................... 290/44 |
| 6,676,379 B2 * | 1/2004 | Eccles et al. ............ 416/170 R |

\* cited by examiner

*Primary Examiner*—Edward Look
*Assistant Examiner*—Sean J Younger
(74) *Attorney, Agent, or Firm*—Oral Caglari, Esq.

(57) ABSTRACT

An emergency power system may provide hydraulic and electrical power to an aircraft in the event of a failure of the aircraft's primary control power system. The system may be constructed as a ram air turbine in which a single ram air fan may drive both a hydraulic pump and an electrical generator. A unique gearbox may incorporate compound gearing to permit the pump and the generator to be driven at different speeds. Thus the pump and the generator may be driven at their respective optimum speeds. The pump and the generator may be detachably mounted on a gearbox that supports the ram air fan. The detachable mounting of the pump and generator may accommodate ease of maintenance of these items. The gearbox may be provided with a ground testing port through which rotational testing force may be introduced to a shaft that supports the ram air fan. This may permit ground level testing of the system. Ground level testing may reduce a need to perform periodic in-flight testing of the system.

11 Claims, 3 Drawing Sheets

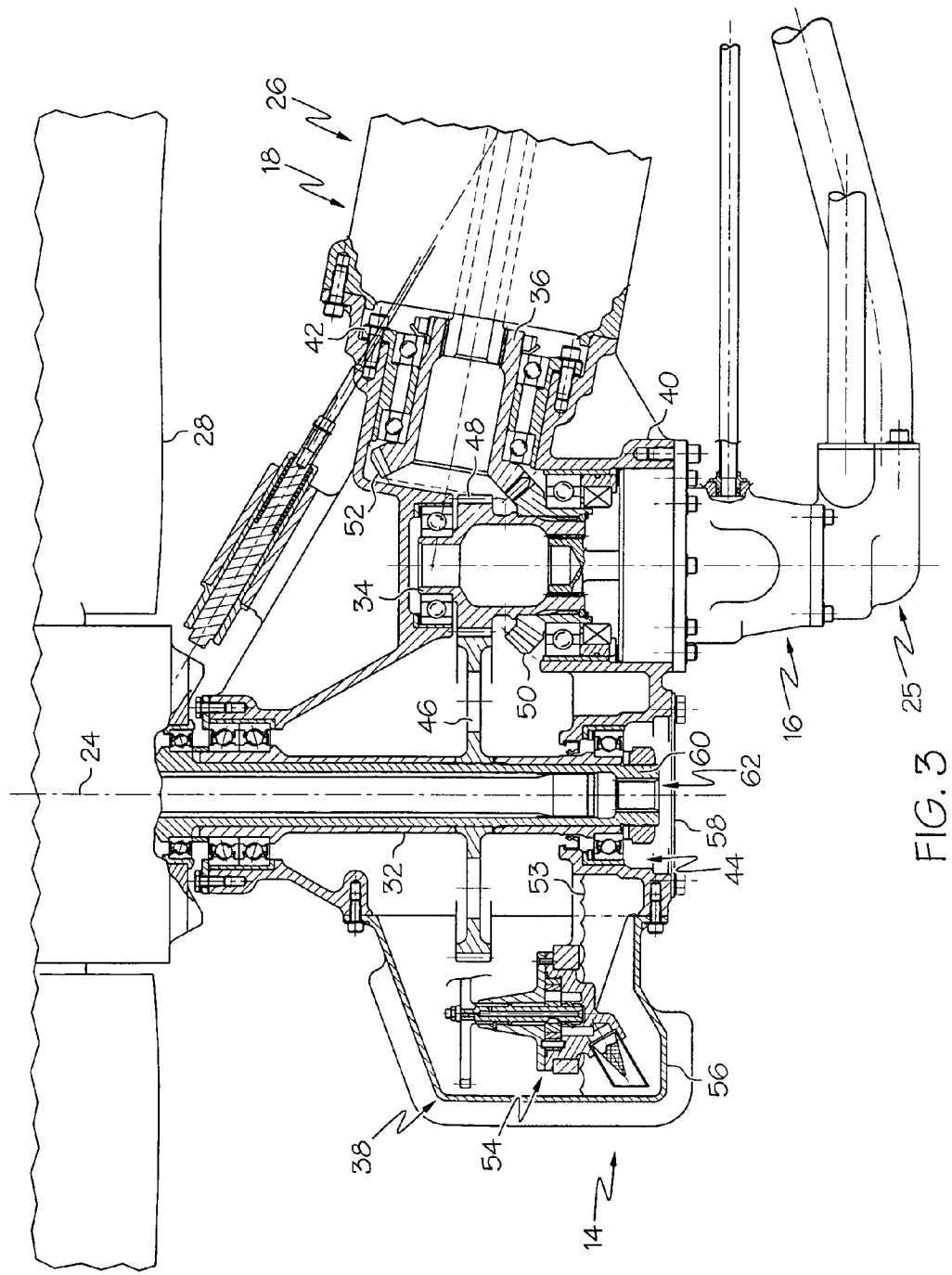

RAM AIR TURBINE WITH COMPOUND GEARTRAIN GEARBOX

BACKGROUND OF THE INVENTION

This invention generally relates to ram air turbine power systems (RATPS) that can be deployed to utilize energy from a passing air stream of a moving aircraft to generate hydraulic and/or electrical power. More particularly, the present invention relates to improvements of a RATPS which facilitate ground-level testing and ease of maintenance of the RATPS.

Many commercial aircraft are equipped with a RATPS. They are important elements in a spectrum of devices used to enhance aircraft safety. Typically, a RATPS is attached to a pivotal strut. During normal operation of an aircraft, the RATPS is held in a stowed position within an enclosed storage bay. In the event of a failure of an electrical or hydraulic power system, the RATPS is moved into a deployed position by opening the storage bay and pivoting the strut on which the RATPS is attached. In a deployed position, a ram air turbine is exposed to an air stream outside the aircraft. The ram air turbine drives a generator and/or a hydraulic pump to provide requisite power for control systems.

A RATPS is only rarely deployed as a matter of operational necessity. Indeed, during the past decade, there may have been only a dozen incidents in which in-flight power failure has required deployment of a RATPS on a commercial aircraft. Nevertheless, it is important to assure that the RATPS is always in a state of operational readiness. The determination of operational readiness is made by periodic testing of the RATPS.

Periodic testing has heretofore been accomplished by intentionally deploying the RATPS while an aircraft is in normal flight. There are inherent risks associated with in-flight testing. It is obviously safer to perform on-ground testing of any safety device. But, in the prior art, a typical RATPS has not been amenable to on-ground testing. A RATPS will only operate when exposed to high velocity air flow associated with a moving aircraft. Consequently, the more risky in-flight testing has generally been used as a standard procedure for assuring operational readiness of the RATPS.

Maintenance of most prior art RATPS's has heretofore been a costly and complex procedure. This is because a typical prior art RATPS is constructed as an integrated combination of a turbine, electrical generator and a hydraulic pump, with both the generator and the pump having their own separate reduction gearing. Consequently, it has been impracticable to remove just a defective pump from a RATPS without a complete disassembly of the turbine, reduction gearing and the generator. Similarly, a defective generator can only be replaced by performing a complete disassembly of the RATPS.

This maintenance difficulty is partially mitigated in a prior art RATPS disclosed in U.S. Pat. No. 4,742,976 issued to Cohen. In the Cohen RATPS, shown as a second embodiment in the subject patent, a hydraulic pump is attached to a flange of a gearbox. A generator is attached on an opposite side of the same gearbox. In this configuration, both the hydraulic pump and the generator are driven by the same rotating shaft. This arrangement facilitates easy replacement of either the pump or the generator. However, both the generator and the pump are driven at the same rotational speed in this arrangement. Consequently, the generator and the pump are both driven at a compromised speed. Neither the generator nor the pump is driven at its respective optimum speed.

As can be seen, there is a need for a RATPS that can be readily ground tested. Additionally, it is important that individual components, such as a generator or a pump of the RATPS, can be expediently replaced. It is desirable that such a system provides optimized rotational speeds for both a generator and a hydraulic pump.

SUMMARY OF THE INVENTION

In one aspect of the present invention, a ram air turbine power system comprises a gearbox having a first rotatable power output shaft and a second rotatable power output shaft. A first energy conversion device is adapted to be driven by the first output shaft. A second energy conversion device is adapted to be driven by the second output shaft. The first output shaft is adapted to rotate at a first output speed and the second output shaft is adapted to rotate at a second output speed different from the first output speed.

In another aspect of the present invention, a ram-air turbine emergency power system for an aircraft comprises a gearbox and at least a first and a second energy conversion device. The gearbox has first and second output shafts. The output shafts are adapted to drive the first and second energy conversion devices. The first output shaft is adapted to rotate at a first output speed. The second output shaft is adapted to rotate at a second output speed. The first output speed is different from the second output speed.

In yet another aspect of the present invention, a gearbox for a ram air turbine aircraft emergency power system comprises an input shaft, a first output shaft, and a second output shaft. The input shaft has a first power output gear attached thereto. The first output shaft has a first power input gear attached thereto. The first power input gear of the first output shaft and the first power output gear of the input shaft are engaged and adapted to produce rotation of the first output shaft. The first output shaft has a second power output gear attached thereto. The second output shaft has a second power input gear attached thereto, said second power input gear being engaged with the second power output gear of the first output shaft and adapted to produce a rotational speed of the first output shaft different from the rotational speed of the second output shaft. The gearbox has an integral housing with device mountings for energy conversion devices, said mountings being adapted to allow power transmitting connections between the energy conversion devices and their respective output shafts.

In still another aspect, the present invention provides an emergency power system for an aircraft comprising a ram air fan positioned adjacent a gearbox with an integral housing. The housing has a testing port therein through which rotational force may be applied to a shaft on which the ram air fan is attached.

These and other features, aspects and advantages of the present invention will become better understood with reference to the following drawings, description and claims.

BRIEF DESCRIPTION OF THE DRAWINGS

FIG. 3 is a partial section view of a portion of the ram air turbine power system of FIG. 1.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in improving the reliability and reducing cost of maintenance of emergency power systems on aircraft. In that regard, the invention may provide on-ground testing capability and ease of maintenance for ram air turbine power systems (RATPS). For illustrative purposes, the following description includes an example of inventive apparatus that may be employed to achieve these desired capabilities in an aircraft emergency power system. However, it is understood that other applications can be substituted for the inventive apparatus.

The present invention is an improvement over the prior art in that means may be provided for ground testing a RATPS whereas in the prior art more risky in-flight testing may have been required. Additionally, the present invention is an improvement over the prior art in that means may be provided for readily removing and replacing power conversion devices, such as generators and hydraulic pumps, from a RATPS without performing a complete disassembly of the RATPS. These improvements may be introduced without diminishing a capability within the RATPS to provide optimum rotational speed for each of the power conversion devices of the RATPS. These improvements over the prior art may be achieved by providing the RATPS with a gearbox that has a compound geartrain which delivers different output speeds to multiple output shafts. The gearbox may be provided with a testing port through which on-ground testing may be performed by applying rotational force to a free end of an input shaft of the gearbox.

Figure 1:
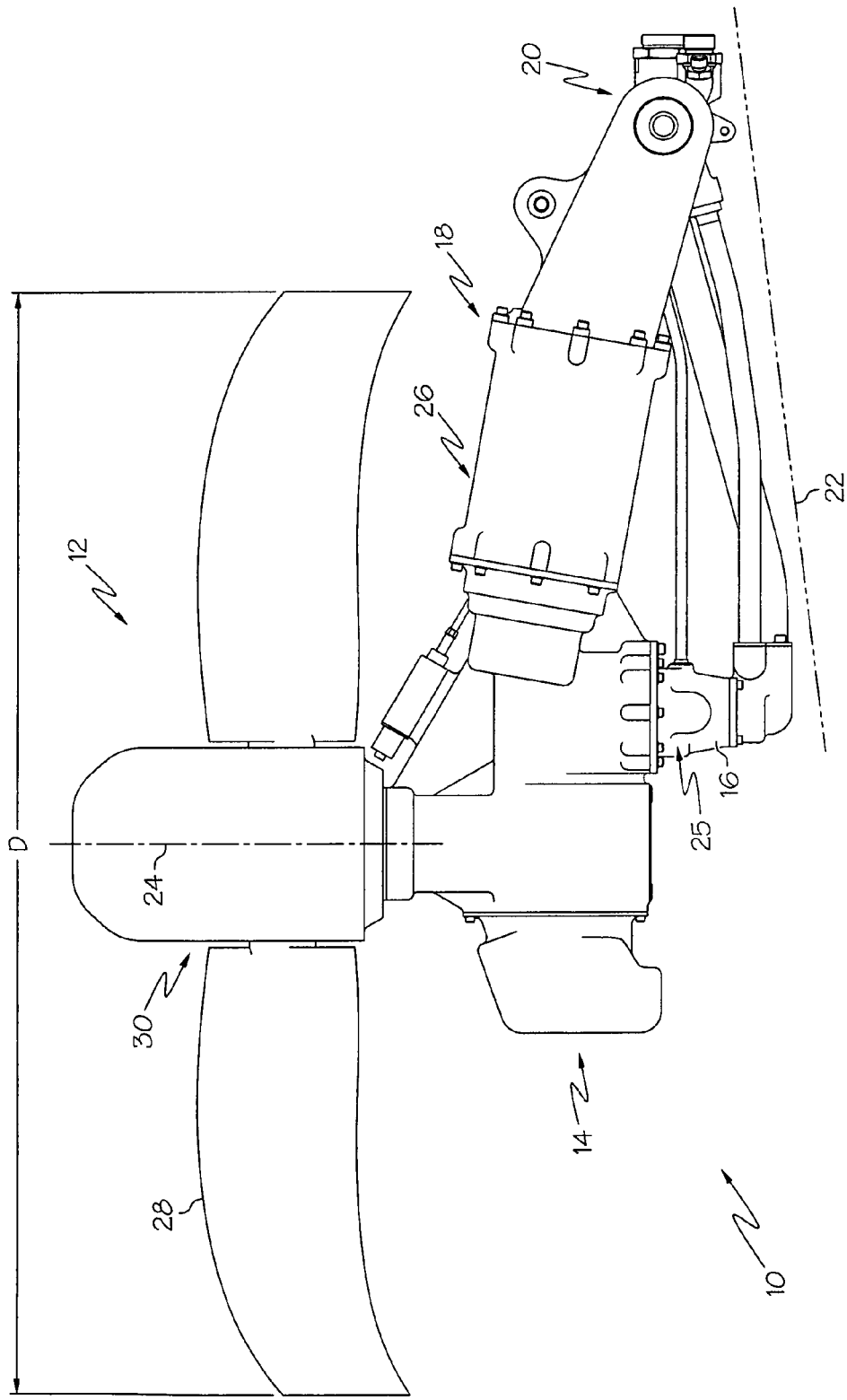
FIG. 1 is an elevation view of a ram air turbine power system, in a stowed position, which embodies the present invention.

Referring now to FIG. 1, there is shown an aircraft emergency power system according to the present invention, and designated by the numeral 10. The system 10 may be of a type known as a ram air turbine power system (hereinafter RATPS). The system 10 may comprise a ram air fan 12 rotationally connected to a gearbox 14 which may drive a hydraulic pump 16 and an electrical generator 18. The system 10 may be supported on a pivotal mounting 20. In FIG. 1, the system 10 is illustrated in a stowed position within a fuselage 22 of an aircraft (not shown).

Figure 2:
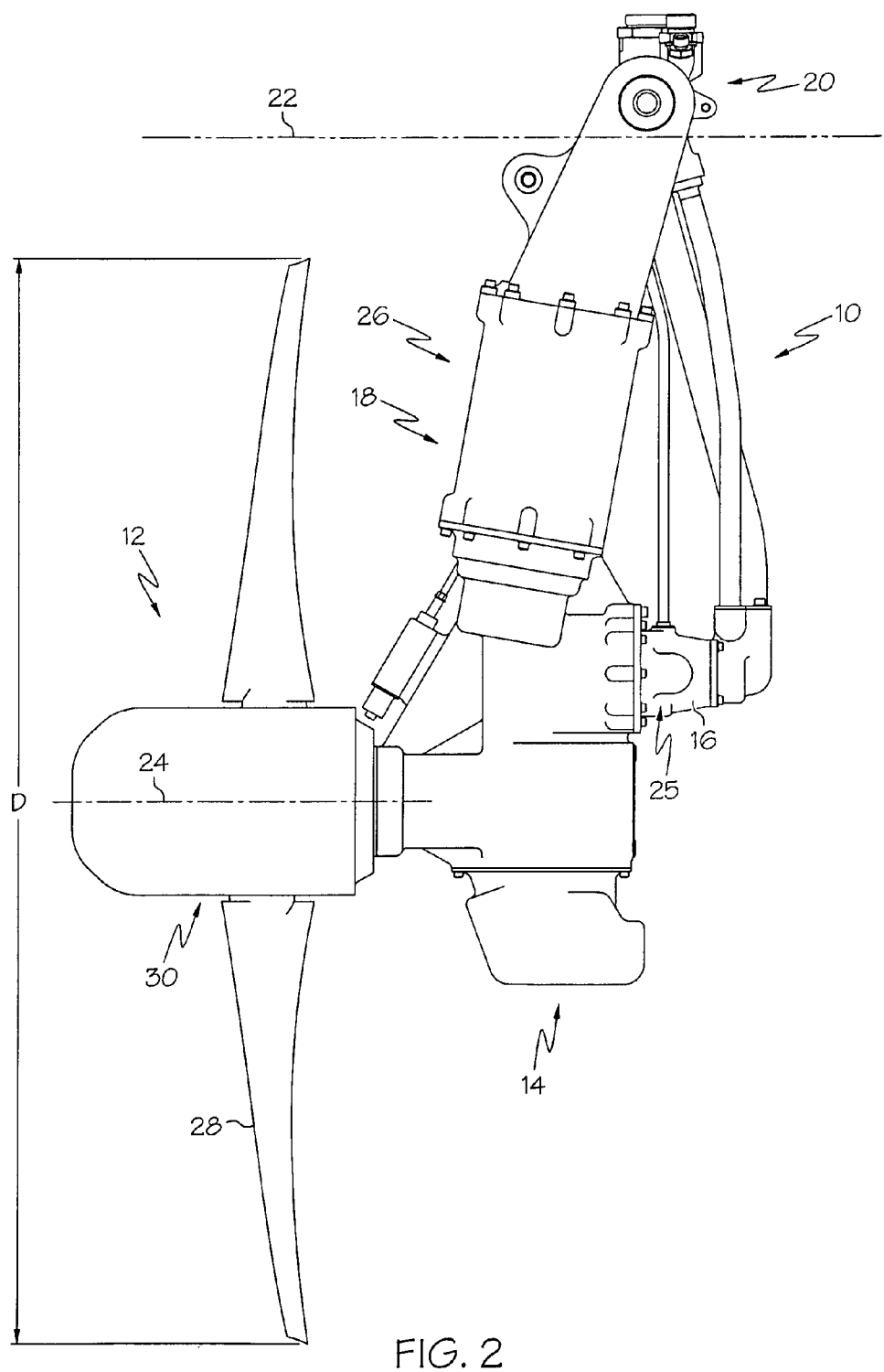
FIG. 2 is an elevation view of the ram air turbine power system of FIG. 1 in a deployed position.

Referring now to FIG. 2, the system 10 is shown in a deployed position. The fan 12 may be oriented so that its rotational axis 24 is generally parallel to a direction of travel of the aircraft.

In a normal mode of operation of the aircraft, the system 10 may remain in the stowed position of FIG. 1. Primary power systems (not shown) of the aircraft may provide electrical and hydraulic power to operate various control systems of the aircraft. In the event of an in-flight failure of the primary power systems, the emergency power system 10 may be moved to its deployed position as shown in FIG. 2.

When the system 10 is deployed, energy may be extracted from a movement of air across the fan 12. The fan 12 may convert air-motion energy into rotational energy which may be transmitted through the gearbox 14 to other energy conversion devices. In the particular example shown in FIGS. 1 and 2, the system 10 may be a RATPS and a first energy conversion device 25 may be the hydraulic pump 16 while a second energy conversion device 26 may be the generator 18.

The fan 12 may have variable pitch blades 28. In FIG. 1, the blades 28 are shown in a feathered position. In FIG. 2, the blades 28 are shown in an operational position. Pitch of the blades 28 may be varied by a conventional governor 30. The governor 30 may maintain a relatively constant rotational speed of the fan 12 irrespective of the speed of the aircraft. Typically, the rotational speed of the fan may be maintained with variations of about 10% or less.

Because the fan speed may be maintained relatively constant, the gear box 14 may transmit driving force at relatively constant rotational speed to both of the energy conversion devices 25 and 26. The gearbox 14 may be constructed with gear ratios selected to provide optimum rotational speeds for each of the energy conversion devices 25 and 26. In a case where the device 25 is the hydraulic pump 16 and the device 26 is the generator 18, it may be desirable to have each of these devices operate at different speeds. Optimum speed for the hydraulic pump 16 may be different from optimum speed for the generator 18.

Referring now to FIG. 3, a sectional view of the gearbox 14 is shown. The gearbox 14 may comprise an input shaft 32, a first output shaft 34, a second output shaft 36, an integral housing 38, a first device mounting 40 for a first energy conversion device 25, a second device mounting 42 for a second energy conversion device 26, and a ground-testing port 44. Each of the mountings 40 and 42 is configured to permit a connection between its respective energy conversion devices 25 and 26 and their respective output shafts 34 and 36.

The input shaft 32 may be attached to and may be driven by the fan 12. A first power output gear 46 may be attached to the input shaft 32. The first power output gear 46 may be engaged with a first power input gear 48 which may be attached to the first output shaft 34. The gears 46 and 48 may be spur gears. A second power output gear 50 may be attached to the first power output shaft 34 and the gear 50 may be engaged with a second power input gear 52 attached to the second power output shaft 36. The gears 50 and 52 may be bevel gears.

In a typical passenger aircraft, power requirements from the system 10 may be as great as about 8 to about 12 kW of electrical power and about 7 to about 10 gpm @ about 5000 psi of hydraulic power. This power may be generated with a ram air fan having a blade path diameter D from about 30 to about 66 inches, typically about 40 inches. These conditions require a high rotational speed for the hydraulic pump 16 and the generator 18. The pump may operate at a speed of from about 9000 to about 11,000 rpm, typically about 10,000 rpm. The generator may operate at a speed of about 10,000 to about 14,000 rpm, typically about 12,000 rpm. At these high speeds and high loads, both the pump 16 and the generator 18 may generate heat. The hydraulic pump 16 may provide its own cooling by passage of hydraulic oil through the pump 16. The generator 18 however may require more cooling than that which can be provided by air flow past the generator.

Cooling of the generator 18 may be provided by re-circulating oil 53 stored in the integral housing 38 of the gearbox 14. The gearbox 14 may be provided with a re-circulation pump 54 for re-circulating the oil 53 onto various moving components within the integral housing 38 and through the generator 18 to provide for cooling of the generator 18. The integral housing 38 may be provided with a sump 56 into which the oil 53 may collect when the system 10 is in a stowed position. The sump 56 may be positioned so that the oil 53 may collect at a location away from the device mountings 40 and 42. This may reduce a potential for leakage of the oil 53.

In an exemplary operation of the system 10, the fan 12 may drive the input shaft 32 at a substantially constant rotational speed. The gears 46 and 48 transmit rotational force to the first output shaft 34, which in this case may be a shaft for the hydraulic pump 16. The pump 16 may be driven at a rotational speed higher than that of the fan 12. By selecting a speed setting for the fan by controlling the governor of FIG. 1 and a gear ratio for the gears 46 and 48, the pump may be driven at its optimum speed. Similarly, the generator 18 may be driven at its optimum speed by proper selection of a gear ratio for the gears 50 and 52.

The mountings 40 and 42 may be configured to provide a simple bolt-on attachment of the pump 16 and the generator 18 to the gearbox 14. Consequently, the pump 16 may be readily removed from the system 10 without a need to disassemble other components of the system 10. The pump 16 and the generator 18 may each be detached from the gearbox 14 without any disassembly of the gearbox 14 and without removal of the ram air fan 12. Similarly, the generator 18 may be readily removed. Consequently, the system 10 is amenable to less costly maintenance than that required for a typical prior art RATPS. In a typical prior art RATPS a pump replacement or a generator replacement may require a disassembly of the entire RATPS.

The system 10 may be ground tested because of the presence of the testing port 44 in the gearbox 14 and a splined testing connector 60 in a free end 62 of the input shaft 32. When a cover plate 58 is removed, the input shaft 32 may be connected to a conventional external testing driver (not shown). The driver may then "spin-up" the system 10 so that all of its operating parameters can be tested. In the prior art, periodic testing of a RATPS unit was performed by deploying the unit during flight of the aircraft. In-flight testing of any safety device is not as reliable and risk free as ground testing. Failures detected during ground testing can be immediately remedied without associated in-flight risks.

It should be understood, of course, that the foregoing relates to exemplary embodiments of the invention and that modifications may be made without departing from the spirit and scope of the invention as set forth in the following claims.

We claim:

1. A ram air turbine power system comprising:
   a ram-air turbine movable from a stowed position, inside a fuselage of an aircraft, to a deployed position;
   a gearbox in communication with a power input shaft having:
      a first rotatable power output shaft; and
      a second rotatable power output shaft;
   a first energy conversion device adapted to be driven by the first output shaft; and
   a second energy conversion device adapted to be driven by the second output shaft;
   wherein the first output shaft is adapted to rotate at a first output speed, the second output shaft is adapted to rotate at a second output speed different from the first output speed, and
   wherein the first energy conversion device and the second energy conversion device are movable, along with the ram-air turbine, from the stowed position to the deployed position, the deployed position being outside of the fuselage of the aircraft, said second energy conversion device having a first end pivotally mounted to said aircraft and a second end opposite said first end, said second end having said second output shaft extending therefrom communicating with said gearbox, said second energy conversion device providing a portion of a support arm for said ram air turbine power system.

2. The apparatus of claim 1 wherein the first and second energy conversion devices are attached directly to the gearbox.

3. The apparatus of claim 1 wherein the first energy conversion device is a hydraulic pump.

4. The apparatus claim 1 wherein the second energy conversion device is an electrical generator.

5. The apparatus of claim 1 wherein:
   the input shaft is provided with a testing connector at a free end thereof; and
   the gearbox is provided with a testing port through which rotational force may be applied to the testing connector.

6. A gearbox for a ram air turbine aircraft emergency power system comprising:
   an input shaft;
   a first output shaft;
   a second output shaft;
   the input shaft having a first power output gear attached thereto;
   the first output shaft having a first power input gear attached thereto;
   the first power input gear of the first output shaft and the first power output gear of the input shaft being engaged and adapted to produce rotation of the first output shaft;
   the first output shaft having a second power output gear attached thereto;
   the second output shaft having a second power input gear attached thereto, said second power input gear being engaged with the second power output gear of the first output shaft and adapted to produce a rotational speed of the first output shaft different from the rotational speed of the second output shaft;
   the gearbox having an integral housing with device mountings for energy conversion devices, said mountings being adapted to allow power transmitting connections between the energy conversion devices and their respective output shafts, said housing, said device mountings, and said devices providing an arm for pivotal mounting of said energy conversion devices and said gearbox to an aircraft, and
   the gearbox being movable about said pivotal mounting from a stowed position inside a fuselage of an aircraft to a deployed position, the deployed position being outside of the fuselage of the aircraft.

7. The apparatus of claim 6 wherein the power output gear of the input shaft and the power input gear of the first output shaft are spur gears.

8. The apparatus of claim 6 wherein the power output gear of the first output shaft and the power input gear of the second output shaft are bevel gears.

9. The apparatus of claim 6 wherein rotational speed ratio of the power output gear of the input shaft and the power input gear of the first output shaft is such that the first output shaft rotates at a speed higher than the speed of the input shaft.

10. The apparatus of claim 6 which further comprises:
    a re-circulating pump for oil;
    a sump for the oil;
    the sump being positioned to allow accumulation of the oil at a location away from the device mountings whenever the gearbox is in an idle mode.

11. The apparatus of claim 6 wherein:
    the input shaft is adapted for attachment to a ram air fan;
    a free end is provided with a testing connector; and
    the integral housing has a testing port therein through which rotational force may be applied to the testing connector.

* * * * *